United States Patent [19]
Hartig et al.

[11] Patent Number: 5,518,093
[45] Date of Patent: May 21, 1996

[54] OVERRUNNING CLUTCH ASSEMBLY

[75] Inventors: Günter Hartig, Nürnberg; Ernst Neuwirth, Herzogenaurach, both of Germany

[73] Assignee: Ina Walzlager Schaeffler KG, Germany

[21] Appl. No.: 425,814

[22] Filed: Apr. 19, 1995

Related U.S. Application Data

[63] Continuation of Ser. No. 71,527, Jun. 2, 1993, abandoned.

[30] Foreign Application Priority Data

Jun. 11, 1992 [DE] Germany .................. 42 19 143.2

[51] Int. Cl.$^6$ ............................ F16D 15/00; F16D 41/00
[52] U.S. Cl. ..................... 192/45; 192/110 B; 384/560
[58] Field of Search .................. 192/45, 45.1, 44, 192/110 B; 384/560, 510, 504

[56] References Cited

U.S. PATENT DOCUMENTS

| | | | |
|---|---|---|---|
| 2,404,221 | 7/1946 | Dodge | 192/45.1 |
| 2,407,772 | 9/1946 | Dodge | 192/45.1 |
| 3,087,590 | 4/1963 | Gorsky | 192/45 |
| 3,194,368 | 7/1965 | Benson et al. | 192/45 |
| 3,581,597 | 6/1971 | Reiersgaard | 192/44 X |
| 5,074,393 | 12/1991 | Itomi | 192/45 |
| 5,078,243 | 1/1992 | Kanai et al. | 192/45 |
| 5,129,495 | 7/1992 | Johnston et al. | 192/45 X |
| 5,199,801 | 4/1993 | Grehn et al. | 384/510 X |
| 5,234,389 | 8/1993 | Goates | 192/45 |
| 5,343,991 | 9/1994 | Premiski et al. | 192/45 |

FOREIGN PATENT DOCUMENTS 637623 5/1950 United Kingdom ............... 384/560

*Primary Examiner*—Rodney H. Bonck
*Attorney, Agent, or Firm*—Bierman and Muserlian

[57] ABSTRACT

An overrunning clutch assembly inserted between a rotary driving element and a rotary driven element and comprising a locking element overrunning clutch and a radial rolling bearing arranged adjacent to each other with a gap therebetween, an axial securing arrangement provided for the two components of the overrunning clutch assembly comprising rims extending laterally from respective cages of the overrunning clutch assembly and the radial rolling bearing, characterized in that the axial securing (3, 3a to 3f) of the locking element overrunning clutch (2,20) and the radial rolling bearing (15,25) is effected in the gap (14, 14a to 14f).

16 Claims, 4 Drawing Sheets

5,518,093

OVERRUNNING CLUTCH ASSEMBLY

PRIOR APPLICATION

This application is a continuation of U.S. patent application Ser. No. 071,527, filed Jun. 2, 1993, now abandoned.

STATE OF THE ART

Overrunning clutches of this type permit the transmission of high torques in a small design space and are used for example for freewheeling and switching operations and also as back-run stops. An overrunning clutch assembly is described in German patent No. 2,758,841 in which a locking element overrunning clutch is inserted between an inner ring anal an outer ring with a radial rolling bearing arranged adjacent the overrunning clutch. Retaining rings arranged externally of the locking element overrunning clutch and the radial roller bearing serve to fix the two components axially. A disadvantage of this construction is that it permits an axial as well as a radial contact of the cages of the two components which can influence their operation. Moreover, the use of retaining means at both ends increases the axial design space requirement. The known construction requires a relatively large design space and double mechanical processing for forming two guide grooves for the axial securing arrangements.

OBJECTS OF THE INVENTION

An object of the invention is to provide a central and effective as well as economical axial fixing with small overall dimensions and involving only, a small amount of mechanical processing while permitting a reduction of the mutual influence of the constituent components of the overrunning clutch assembly on each other.

This and other objects and advantages of the invention will become obvious from the following detailed description.

THE INVENTION

The overrunning clutch assembly of the invention inserted between a rotary driving element and a rotary driven element and comprising a locking element overrunning clutch and a radial rolling bearing arranged adjacent to each other with a gap therebetween, an axial securing arrangement provided for the two components of the overrunning clutch assembly comprising rims extending laterally from respective cages of the overrunning clutch assembly and the radial rolling bearing, is characterized in that the axial securing (3, 3a to 3f) of the locking element overrunning clutch (2,20) and the radial rolling bearing (15,25) is effected in the gap (14, 14a to 14f).

The construction of the overrunning clutch assembly of the invention provides an axial securing device arranged in the gap between the locking element overrunning clutch and the radial rolling bearing for the entire overrunning clutch assembly which comprises no further securing means. Advantageously, the central position-fixing reduces the design space required in the axial direction for the overrunning clutch assembly and, moreover, it reduces the amount of mechanical processing involved. Advantageously, for its guidance, the axial securing device of the invention requires only one groove or one undercut made in an already existing ground recess in the rotary driving or driven element. The construction of the invention advantageously effects a direct transmission of any axial Forces occurring in the locking element overrunning clutch or in the radial rolling bearing without a detrimental effect on the adjacent component in each case. The construction of the invention guarantees that axial forces are transmitted directly or indirectly by the rim situated in the gap via the rim of the adjacent component into the groove or the ground recess or undercut made in the rotary driving or driven element. Thus, advantageously, the loading of the cage of one of the components by an axial force triggered by the adjacent component does not take place.

Even when differential rotation i.e. relative movement between the rim of the radial rolling bearing and the rim of the locking element overrunning clutch occurs due to their different modes of operation, advantageously no detrimental effect ensues because the axial forces are transmitted directly, i.e. along the shortest path. Therefore, no radial guidance of the two constituent components of the overrunning clutch assembly is necessary because a radial contact between the cages does not occur in any state of operation of the locking element overrunning clutch and the radial bearing.

In one embodiment of the invention, one rim of each of the locking element overrunning clutch and the radial rolling bearing engages directly or indirectly into a groove arranged in the gap. The groove can be disposed optionally on the rotary driven element or driving element. This enables the location of the securing device to be selected in keeping with individual requirements.

To facilitate installation, the rims of the locking element overrunning clutch and the radial rolling bearing snap elastically into the groove. This arrangement is preferred in an overrunning clutch assembly in which the locking element overrunning clutch and the radial rolling bearing are of equal radial size. An alternative arrangement, particularly when the overrunning clutch assembly has to be installed in a stepped bore, is that only rim, either that of the locking element overrunning clutch or of the radial rolling bearing snaps into the groove, the other rim being inserted into the guide groove, for example, already before assembly of the rotary driving and driven elements.

In another embodiment of the invention, the rims engaging into the groove extend radially beyond the ,components to which they belong and thus effect a direct fixing of the component concerned.

In the case of an overrunning clutch assembly to be inserted into a stepped bore, the invention offers the possibility of utilizing the ground recess existing in the stepped region for guiding a rim therein to assure an axial securing of the overrunning clutch assembly. Further, a radial rolling bearing or a locking element overrunning clutch comprising an angular rim can be used in a stepped bore and is axially fixed between the shoulder of the stepped bore and the adjacent rim.

A further embodiment provides a single or double cranked rim inserted into the gap and engaging radially and axially over the corresponding rim in a recess while serving to guide this rim in at least one axial direction. This measure also leads to a reduction of design space requirements because the radially larger rim, particularly the rim of the locking element overrunning clutch, encloses the corresponding rim without influencing it radially. The cranked shape of a rim advantageously assures that any axial forces of one component of the overrunning assembly are transmitted in both directions directly into the groove or the ground recess without the adjacent component being influenced. Advantageously, double cranking is done so as to obtain a substantially inverse U-shaped cross-section and a web wall at the end thereof behind which the corresponding rim engages which is thus axially limited in both directions in the cranked region. To optimize the overall dimensions of the axial securing device, the axial extent of the cranked region corresponds substantially to the axial width of the groove.

The invention further advantageously offers the possibility of making the locking element overrunning clutch as a pre-assembled separate component by making the rims as inter-engaging parts, particularly with a cranked rim enclosing the adjacent rim. This solution offers economical installation in special cases.

To obtain a groove with a small axial width and a small radial depth, the invention provides a rim comprising a local, radially outward directed fixing element which, advantageously, is arranged on a cranked rim and engages into a groove, particularly into a ground recess which is enlarged for example to form an undercut. The radially outward directed fixing element can be made optionally as a circumferential projection, as cams projecting partially from the rim, or it can have any other geometric shape which is rotationally symmetrical.

A further embodiment of the invention provides a spacer or a stop in the form of a separate element inserted into the groove. Advantageously, the spacer prevents contact and consequently also mutual influencing of the rim independent of the state of operation of the radial rolling bearing and the locking element overrunning clutch.

The invention further provides a stop inserted into the groove on one side which advantageously permits the use of a series radial rolling bearing or a series locking element overrunning clutch without a special configuration of the rims for axial securing. In the installed state of the radial rolling bearing or the locking element clutch, the rim concerned engages behind the stop arranged on one wall of the groove, and the rim is thus axially fixed.

Advantageously, the spacer has a cross-sectional profile comparable with the letter T whose horizontal portion surrounds the outer radial periphery of the rims of the radial rolling bearing and the locking element overrunning clutch while the vertical portion of the spacer disposed between the two rims in the groove separates these axially from each other. The spacer and the stop are made preferably of an elastomer or an equivalent plastic material and are configured as a rotationally symmetrical component which is inserted into thee groove and positionally fixed there.

The invention further provides that the rims used to achieve axial securing are elastic which facilitates the snapping-in of the rim into the recess of the adjacent cranked rim or behind the stop to obtain radial overlapping of the end regions of these associated components.

Referring now to the drawings.

Figure 1:
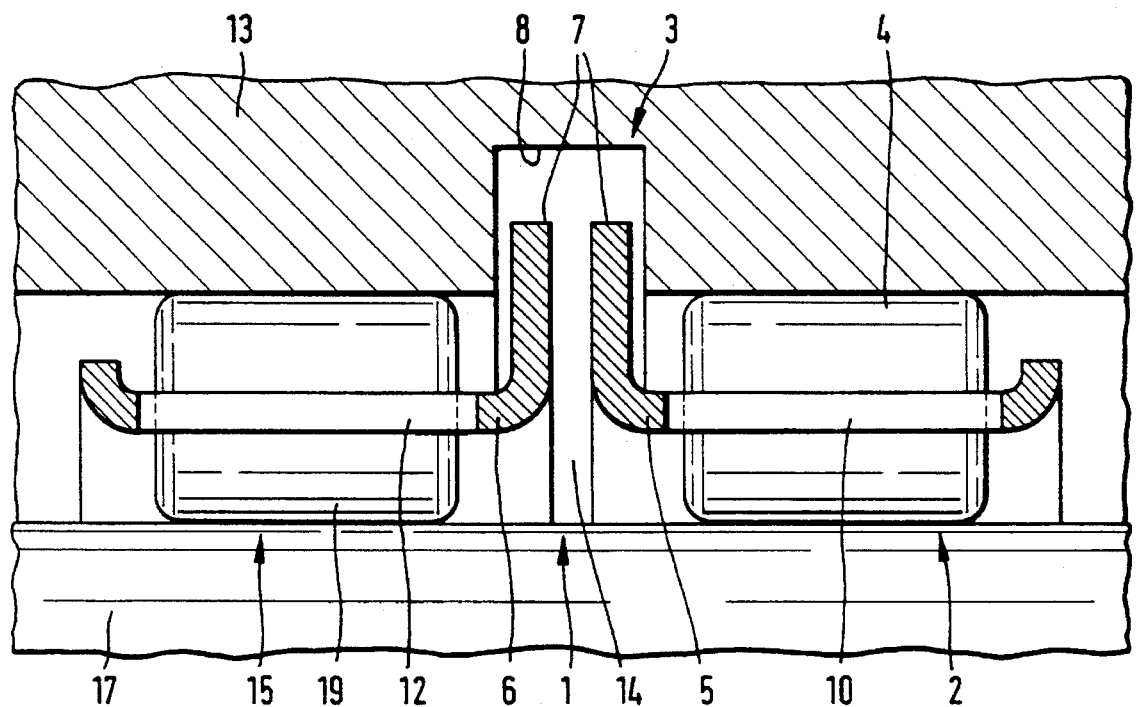
FIG. 1 is a view showing an overrunning clutch assembly of the invention arranged in a rectilinear space between a rotary driving element and a rotary driven element. The mutually aligned rims of the radial rolling bearing and the locking element overrunning clutch are bent radially outwards at equal angles and guided in a groove.

FIG. 1 is an embodiment of the overrunning clutch assembly of the invention in the installed state which is inserted between a rotary driving element 13 and a rotary driven element 17 and comprises a locking element overrunning clutch 2 and a radial rolling bearing 15. The locking element overrunning clutch 2 comprises locking elements 4, a cage 10 comprising a web and suspension elements not shown in FIG. 1, and rims extending axially laterally out of the locking element overrunning clutch 2 as extensions of the cage. The radial rolling bearing 15 comprises rolling elements 19 which, guided by a cage 12, are arranged around the rotary driven element 17, and rims arranged essentially in the same manner as the rims of the locking element overrunning clutch 2. The locking element overrunning clutch 2 comprises an angular rim 5 with a radial dimension larger than that of the locking elements 4, which is arranged in a gap 14 and which, similar to the rim 6 of the radial rolling bearing 15, projects into the groove 8 and assures a fixing 7 of the respective component thus constituting the axial securing arrangement 3 of the overrunning clutch assembly 1.

In FIGS. 2 to 9 which are further examples of embodiments of the invention the same reference numbers are used for parts identical with those of FIG. 1 so that for their description, one is referred back to the description of the first example of embodiment.

Figure 2:
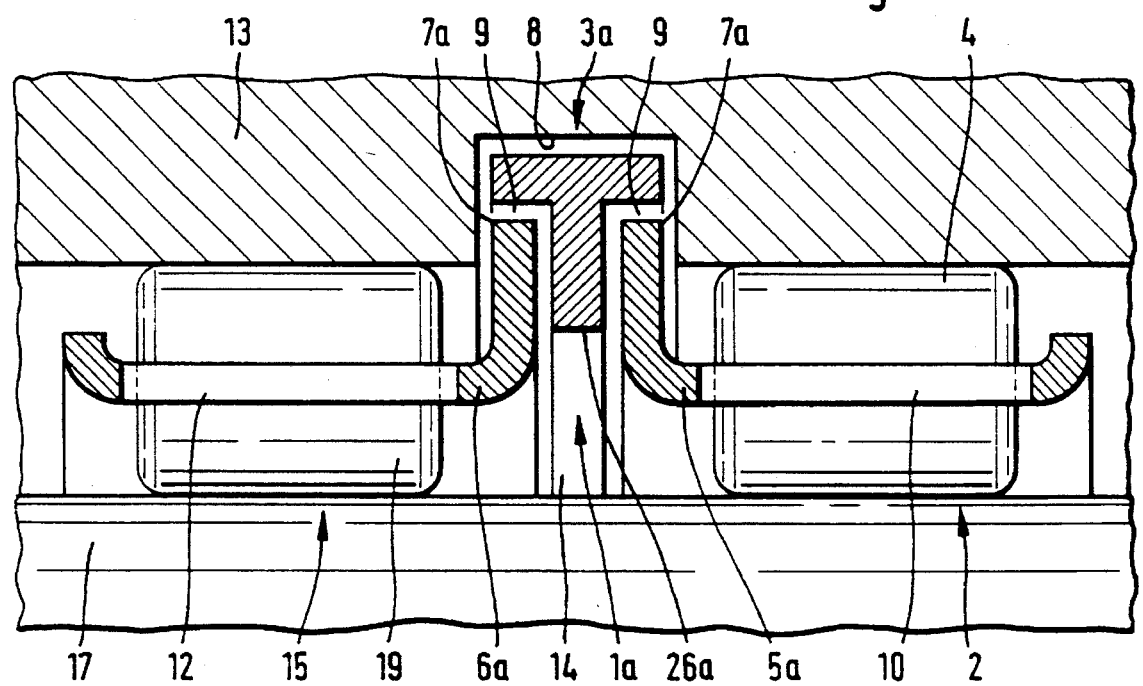
FIG. 2 is a view similar to the that of FIG. 1 with a spacer additionally inserted into the groove.

To obtain a completely separate fixing 7a of the rims 5a, 6a, in the embodiment of FIG. 2, a spacer 26a with a T-shaped cross-section is inserted into the groove 8. The horizontal portion of the spacer 26a essentially bridges the radial gap between the outer periphery of the rims 5a, 6a and the groove base, while the vertical portion of the spacer 26a separates the rims 5a, 6a axially from each other in the installed state. The axial securing arrangement 3a of the overrunning clutch assembly 1a thus assures a complete separation of the locking element overrunning clutch 2 and the radial rolling bearing 15 both in the axial and in the radial direction, there existing in the radial direction a radial gap 9 between the rims 5a, 6a and the spacer 26a.

Figure 3:
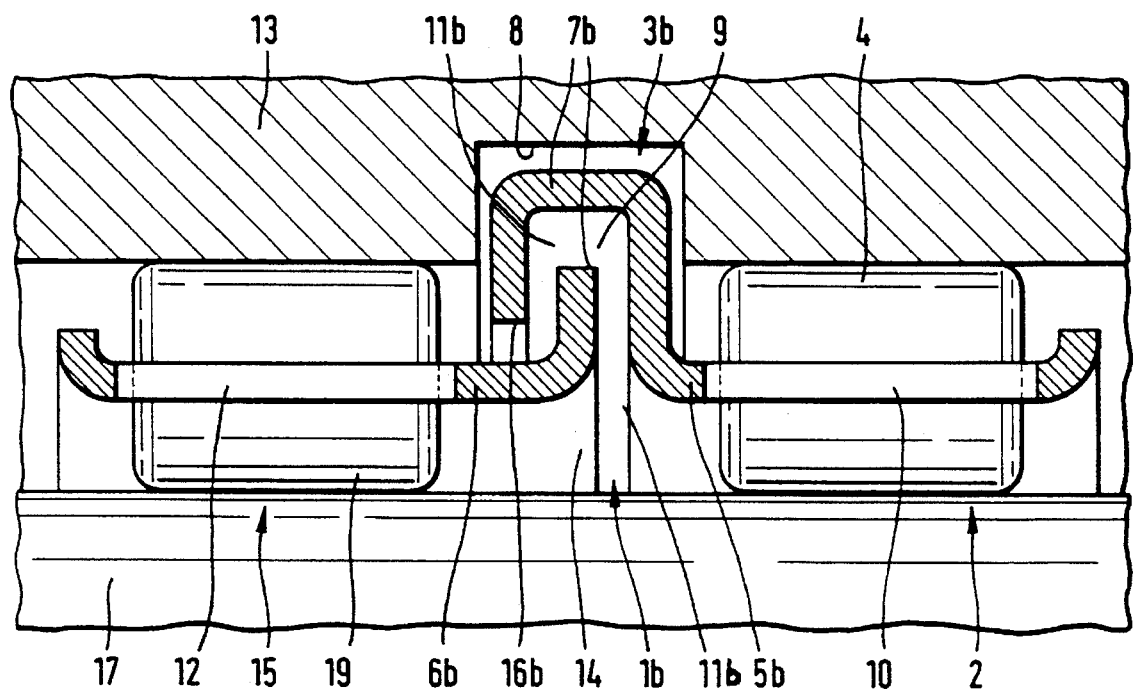
FIG. 3 is a view showing a cranked rim in whose radially inwards directed recess the rim of the adjacent component is inserted and guided.

In FIG. 3, the cranked configuration of the rim 5b can be seen which is substantially of an inverse U-shape oriented towards the rotary driven element 17 and guided in groove 8. The end region of the rim 5b forms the web wall 16b which, in the installed state of the overrunning clutch assembly 1b, engages behind the rim 6b to form a common axial securing 3b. Between the free angular end of the rim 6b and the rim 5b, there exists a radial gap 9.

Figure 4:
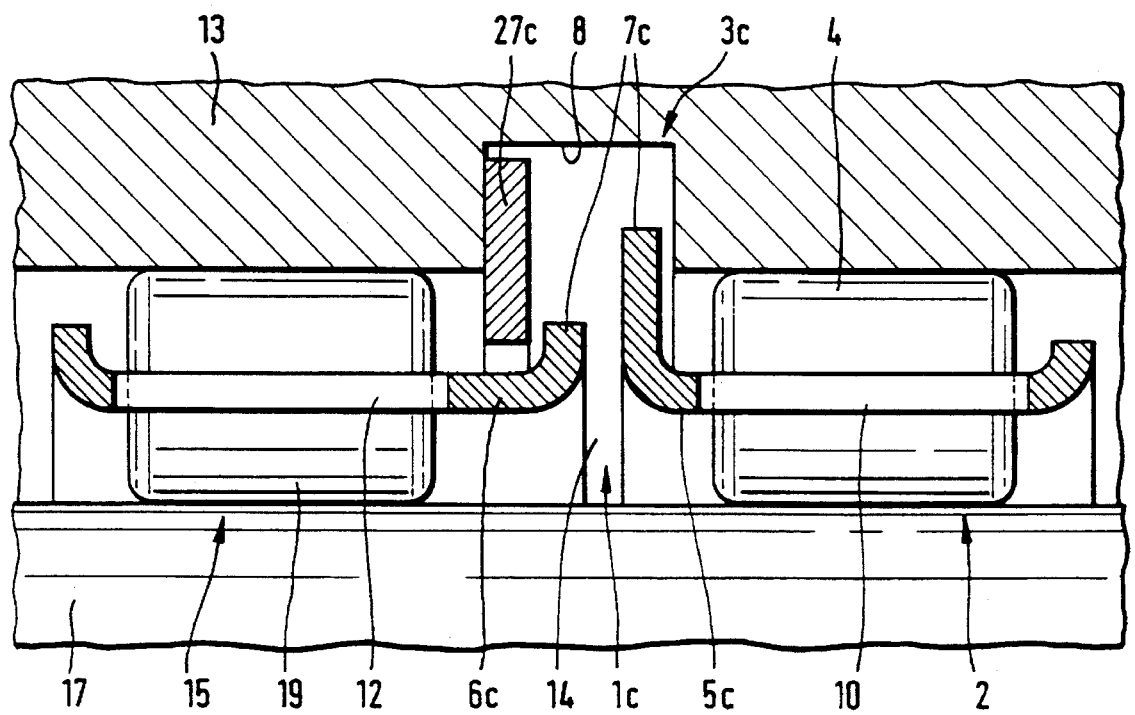
FIG. 4 is a view showing a stop inserted into the groove behind which stop a rim engages in the installed state.

In the example of the embodiment of FIG. 4, a stop 27c is arranged on one side wall of the groove 8 and extends radially into the bore of the rotary driving element 13. The rim 6c of the radial rolling bearing 15 engages behind the stop 27c thus forming together with the rim 5c which is snapped into the groove 8, the axial securing arrangement 3c of the overrunning clutch assembly 1c.

Figure 5:
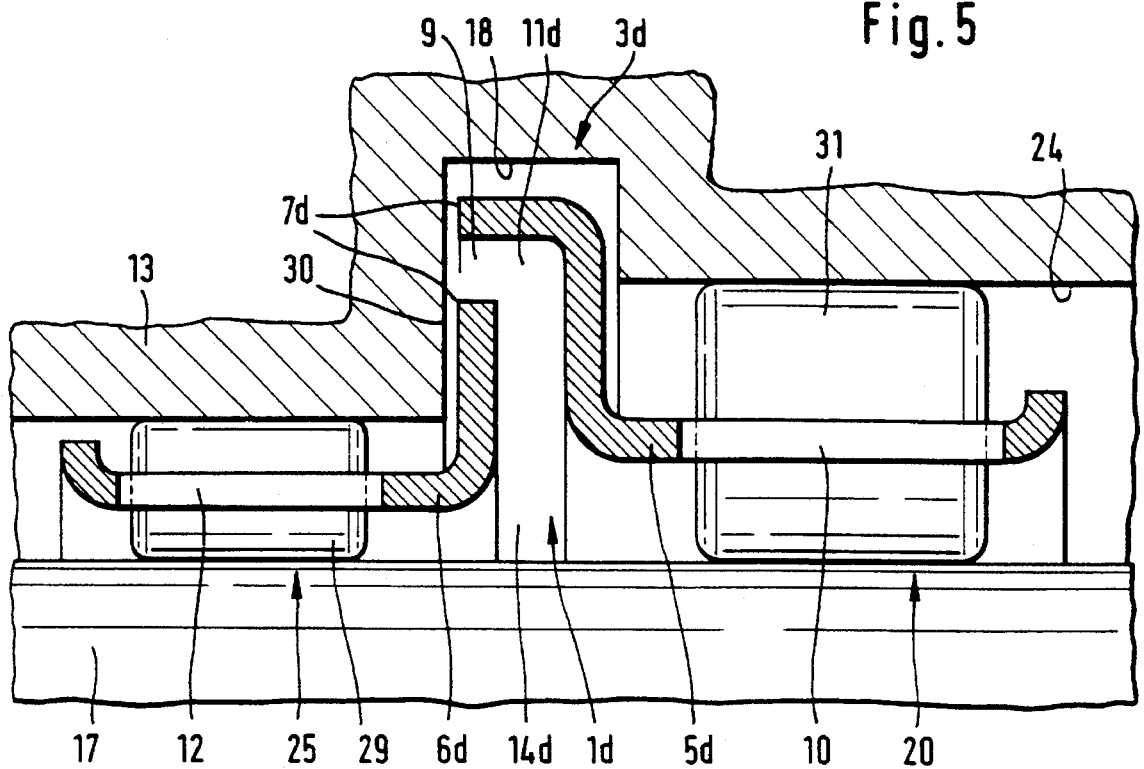
FIG. 5 is a view showing a single cranked rim in whose recess the adjacent rim is guided.

In FIG. 5, the axial securing arrangement 3d of the overrunning clutch assembly 1d can be seen which is inserted into a rotary driving element 13 having a stepped bore 24. Corresponding to the radial offset, a locking element overrunning clutch 20 is provided, the outer diameter of whose locking elements 31 differs from that of the rolling elements 29 of the radial rolling bearing 25. The rim 5d of the locking element overrunning clutch 20 has a single cranked bend which is guided in the groove 18 and comprises a recess 11d facing the radial rolling bearing 25, into which recess 11d and rim 6d projects. Advantageously, this embodiment does not require the rim 6d of the radial rolling bearing to snap into the groove or the ground recess and thus facilitates assembly and disassembly of the overrunning clutch assembly. In the installed state, rim 6d is axially fixed by shoulder 30 and rim 5d. The radial separation of the rims 5d, 6d is made clear also in the embodiment of FIG. 5 by the existence of the radial gap 9.

Figure 6:
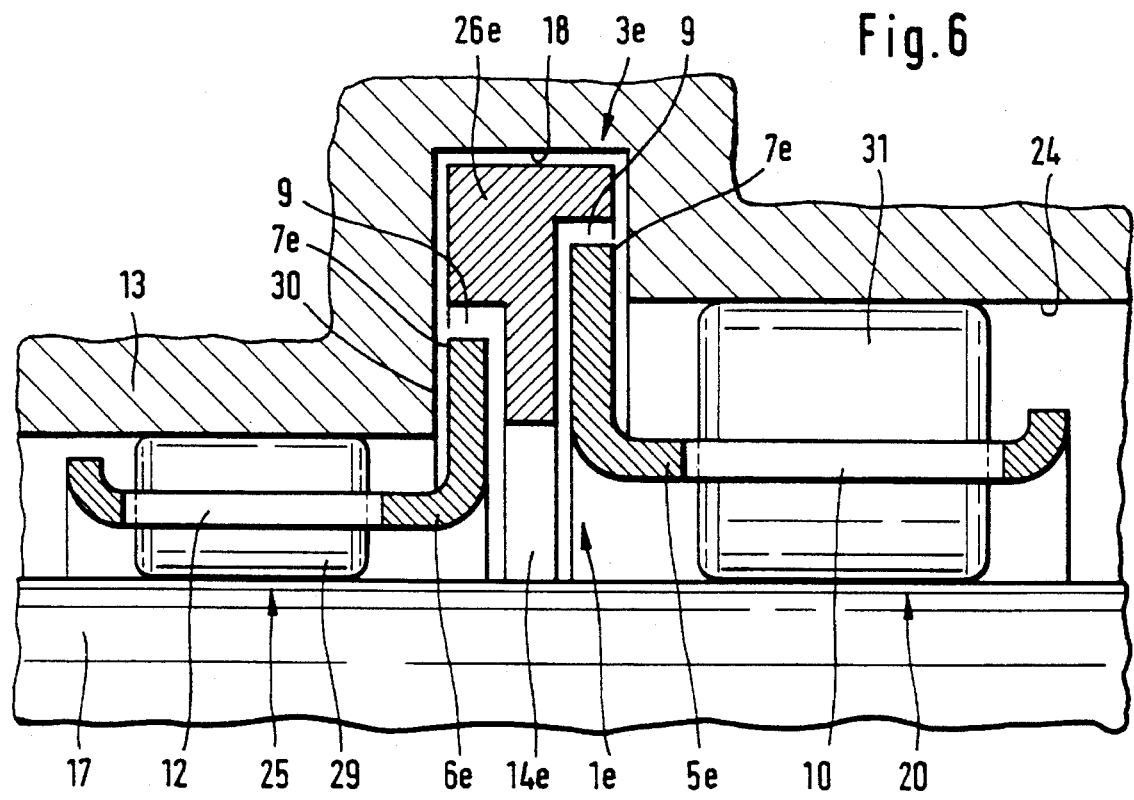
FIG. 6 is a view showing a spacer similar to that of FIG. 2 inserted into a groove in a stepped bore.
Figure 7:
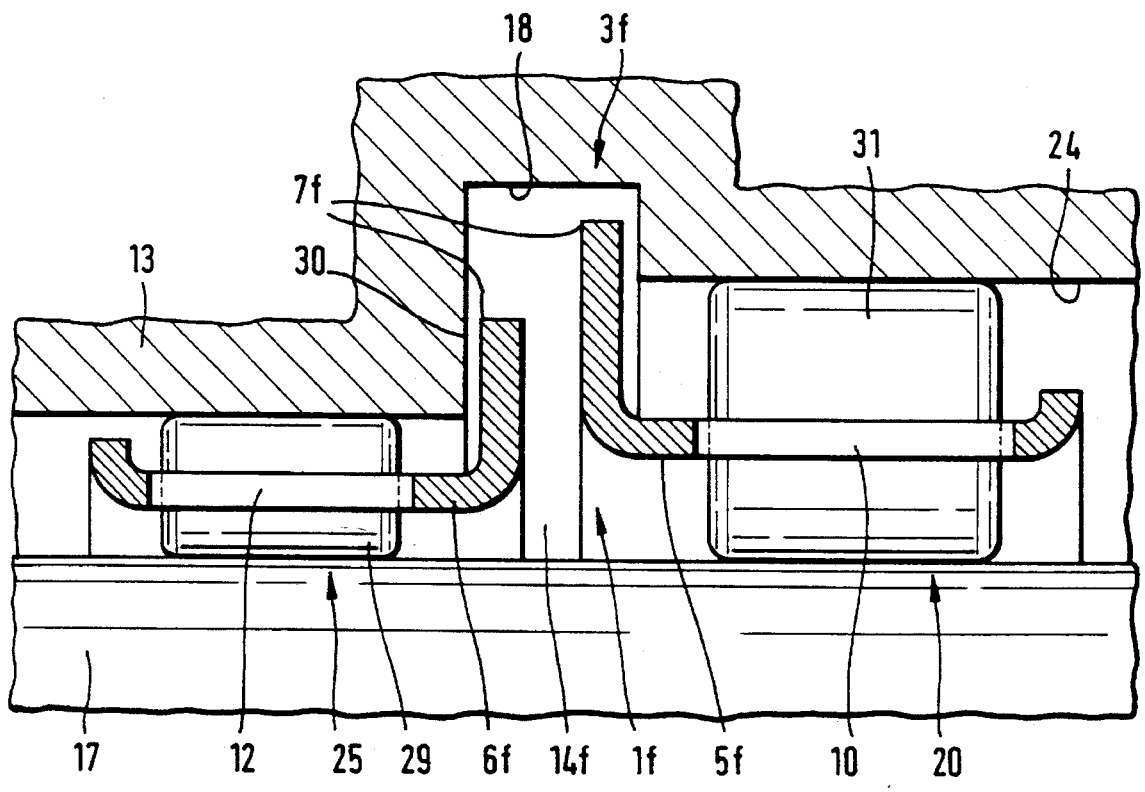
FIG. 7 is a view showing an overrunning clutch assembly in a stepped bore whose axial securing arrangement is comparable to that of FIG. 1.

The axial securing arrangement 3e of FIG. 6 for a stepped bore is largely comparable to the axial securing arrangement 3a of FIG. 2. Corresponding to the different diameters of the stepped bore, the spacer 26e is unsymmetrical in shape, i.e., the recesses of the spacer 26e for the rims 5e, 6e differ from each other. The embodiment of FIG. 7 shows the axial securing arrangement 3f for a stepped bore which is similar to the axial securing arrangement 3 of FIG. 1.

Various modifications of the overrunning clutch assembly of the invention may be made without departing from the spirit or scope thereof and it is to be understood that the invention is intended to be limited only as defined in the appended claims.

What we claimed is:

1. An overrunning clutch assembly inserted between a rotary driving element and a rotary driven element and comprising a locking element overrunning clutch and a radial rolling bearing arranged adjacent to each other with a gap therebetween, an axial securing arrangement provided for said locking element overrunning clutch and said radial rolling bearing of the overrunning clutch assembly comprising rims extending laterally from respective cages of the locking element overrunning clutch and the radial rolling bearing, characterized in that locking elements (4,31) of the locking element overrunning clutch (2,20) and rolling elements (19,29) of the radial rolling bearing (15,25) are arranged in direct contact with the rotary driving element (13) and the rotary driven element (17) against a bore wall and a peripheral surface, both the rotary driving and the rotary driven element having a one-piece configuration and the axial securing arrangement (3,3a to 3f) of the overrunning clutch assembly (1, 1a to 1f) comprising a groove (8,18) made in the rotary driving element (13) or in the rotary driven element (17) in a region of the gap (14,14a to 14f), into which groove (8,18) one rim of each of the locking element overrunning clutch (2,20) and the radial rolling bearing (15,25) engages directly or with cooperation of another component.

2. An overrunning clutch assembly of claim 1 wherein the rims (5, 5a; 6, 6a) of the locking element overrunning clutch (2) and the radial rolling bearing (15) snap elastically into the groove (8).

3. An overrunning clutch assembly of claim 1 wherein only one rim of the locking element overrunning clutch (2,20) or a rim of the radial rolling bearing (15,25) snaps elastically into the groove (8,18).

4. An overrunning clutch assembly of claim 1 wherein the rims of the locking element overrunning clutch (2,20) and the radial rolling bearing (15,25) directed towards the gap (14, 14a to 14f) extend radially beyond the locking element overrunning clutch (2,20) and the radial rolling bearing (15,25) respectively into the groove (8,18).

5. An overrunning clutch assembly of claim 1 wherein the groove is in the form of an undercut.

6. An overrunning clutch assembly of claim 1 wherein the axial securing arrangement (3b,3d) comprises a U- or Z-shaped rim on the locking element overrunning clutch (2,20) or on the radial rolling bearing (15,25), and one of the two rims engages radially and axially over the other of the two rims and guides it at least in one axial direction within a recess (11b,11d).

7. An overrunning clutch assembly of claim 6 wherein the recess (11b) has a substantially inverted U-shaped configuration and the rim (6b) of the radial rolling bearing (15) is axially limited in both directions by the rim (5b) of the locking element overrunning clutch (2).

8. An overrunning clutch assembly of claim 7, wherein the interengaging rims (5b,6b) of the locking element overrunning clutch (2) and the radial rolling bearing (15) are held inseparably together by positive engagement.

9. An overrunning clutch assembly of claim 7 wherein the rim (6b) of the radial rolling bearing (15) engages behind a web wall (16b) formed by a free end of the rim (5b) of the locking element overrunning clutch (2) so that a radial end region of the rim (6b) of the radial rolling bearing (15) and a radial end region of the web wall (16b) overlap each other in the installed state.

10. An overrunning clutch assembly of claim 6 wherein to effect fixing, a region of the U-shaped or Z-shaped rim (5b,5d) of the locking element overrunning clutch (2) extends substantially through an axial width of the groove (8,18).

11. An overrunning clutch assembly of claim 1 wherein a spacer (26a,26b) inserted into the groove (8,18) in the gap (14,14a) assures a positional fixing of and separation between the rim (5a,5e) of the locking element overrunning clutch (2,20) and the rim (6a,6e) of the radial rolling bearing (15,25), an axial separation of the rims (5a,6a; 5e,6e) being enabled by a vertical portion of the spacer (26a,26e).

12. An overrunning clutch assembly of claim 11 wherein the spacer (26a,26e) has a cross-sectional profile comparable with the letter T whose horizontal portion is arranged spaced from an outer radial periphery of the rims (5a,6a; 5e,6e) which are inserted into the groove (8,18).

13. An overrunning clutch assembly of claim 11 wherein the spacer (26a,26e) is rotationally symmetrical part made of an elastomer or an equivalent plastic material and is inserted into or positionally fixed in the groove (8,18).

14. An overrunning clutch assembly of claim 1 wherein a stop (27c) is inserted into the groove (8) in the gap to position the rims (5c,6c) of the locking element overrunning clutch (2) and the radial rolling bearing (15).

15. An overrunning clutch assembly of claim 14 wherein the stop (27c) is a rotationally symmetrical part made of an elastomer or an equivalent plastic material and is inserted into or positionally fixed in the groove (8).

16. An overrunning clutch assembly of claim 14 wherein the rim (6c) of the radial rolling bearing (15) engages behind the stop (27c), and radial end regions of said rim (6c) and said stop (27c) overlap each other in the installed state.

* * * * *